(12) United States Patent
Honda et al.

(10) Patent No.: US 6,988,244 B1
(45) Date of Patent: Jan. 17, 2006

(54) IMAGE GENERATING APPARATUS AND METHOD

(75) Inventors: Fumitaka Honda, Chiba (JP); Koji Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/571,427

(22) Filed: May 15, 2000

Related U.S. Application Data

(63) Continuation of application No. PCT/JP98/04192, filed on Sep. 17, 1998.

(51) Int. Cl.
  *G11B 27/00* (2006.01)
  *H04N 5/44* (2006.01)
  *H04N 7/173* (2006.01)

(52) U.S. Cl. ............... 715/721; 715/731; 715/723; 725/38

(58) Field of Classification Search ............ 725/38, 725/39, 56, 57; 348/564, 588; 345/721, 345/731, 776, 723; 715/721, 731, 723, 776
See application file for complete search history.

(56) References Cited

U.S. PATENT DOCUMENTS

| | | | | |
|---|---|---|---|---|
| 5,363,504 A | * | 11/1994 | Hasuo | 707/104.1 |
| 5,532,830 A | * | 7/1996 | Schuler | 386/125 |
| 5,559,949 A | * | 9/1996 | Reimer et al. | 345/720 |
| 5,819,103 A | * | 10/1998 | Endoh et al. | 710/1 |
| 5,963,203 A | * | 10/1999 | Goldberg et al. | 345/723 |
| 6,181,867 B1 | * | 1/2001 | Kenner et al. | 386/46 |
| 6,377,745 B2 | * | 4/2002 | Akiba et al. | 386/68 |
| 6,734,877 B1 | * | 5/2004 | Hondo et al. | 345/721 |

FOREIGN PATENT DOCUMENTS

| | | |
|---|---|---|
| JP | 59-214959 | 12/1984 |
| JP | 2-260075 | 10/1990 |

* cited by examiner

*Primary Examiner*—Vivek Srivastava
(74) *Attorney, Agent, or Firm*—Frommer Lawrence & Haug LLP; William S. Frommer; Thomas F. Presson

(57) ABSTRACT

An index picture as a still picture obtained by summarizing the contents of a moving picture, which is generated by using a video browser technique can be formed in various modes. A plurality of kinds of generating modes for generating an index picture by summarizing the contents of a moving picture are prepared, any of the modes is selected, and a generating process is performed in the selected mode. It enables an index picture to be generated in a proper form according to the property, use, and the like of a moving picture material.

16 Claims, 16 Drawing Sheets

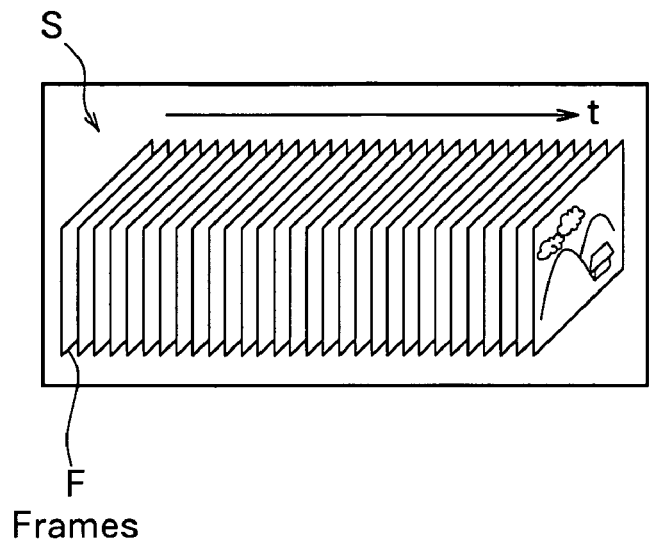
FIG.5A
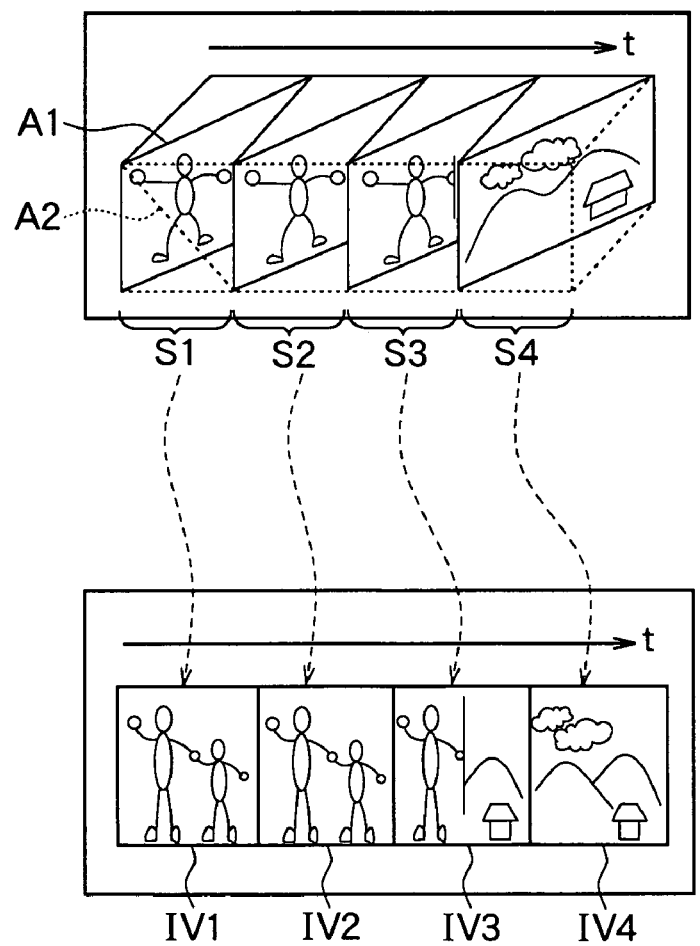
FIG.5B
FIG.5C

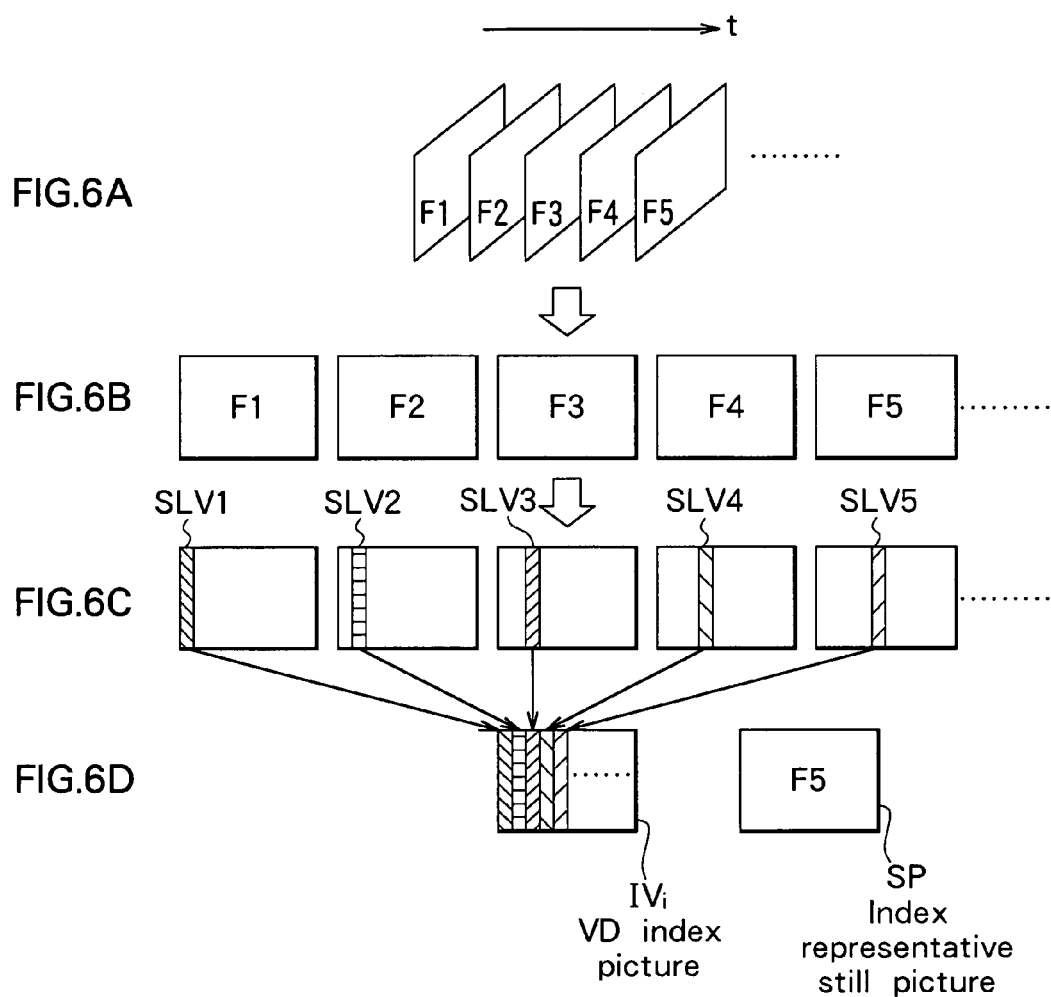

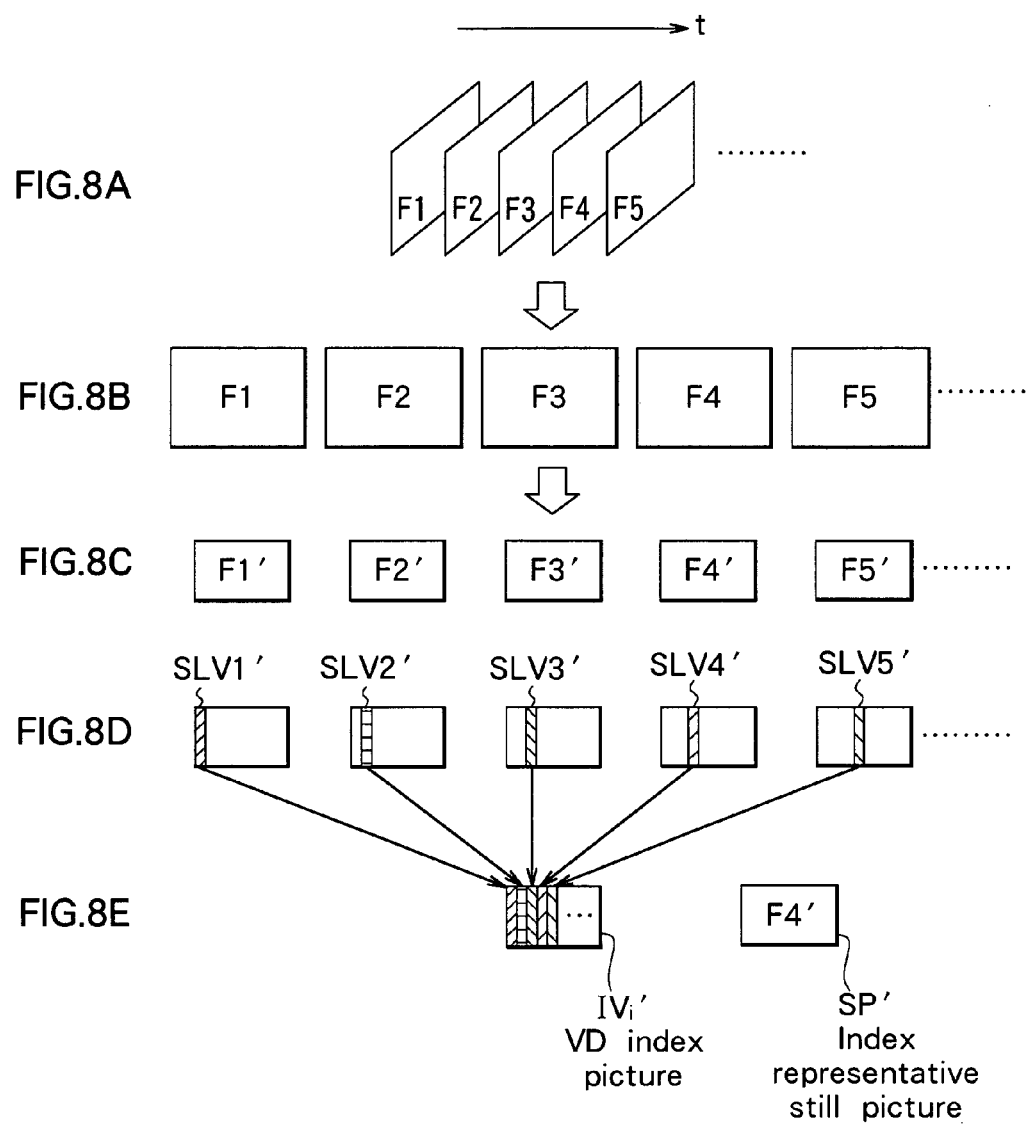

|  |  | Vertical | Horizontal |
|---|---|---|---|
| Whole frame | non − mixing | M1 mode | M2 mode |
|  | mixing | M3 mode | M4 mode |
| Partial frame | non − mixing | M5 mode | M6 mode |
|  | mixing | M7 mode | M8 mode |

FIG.10

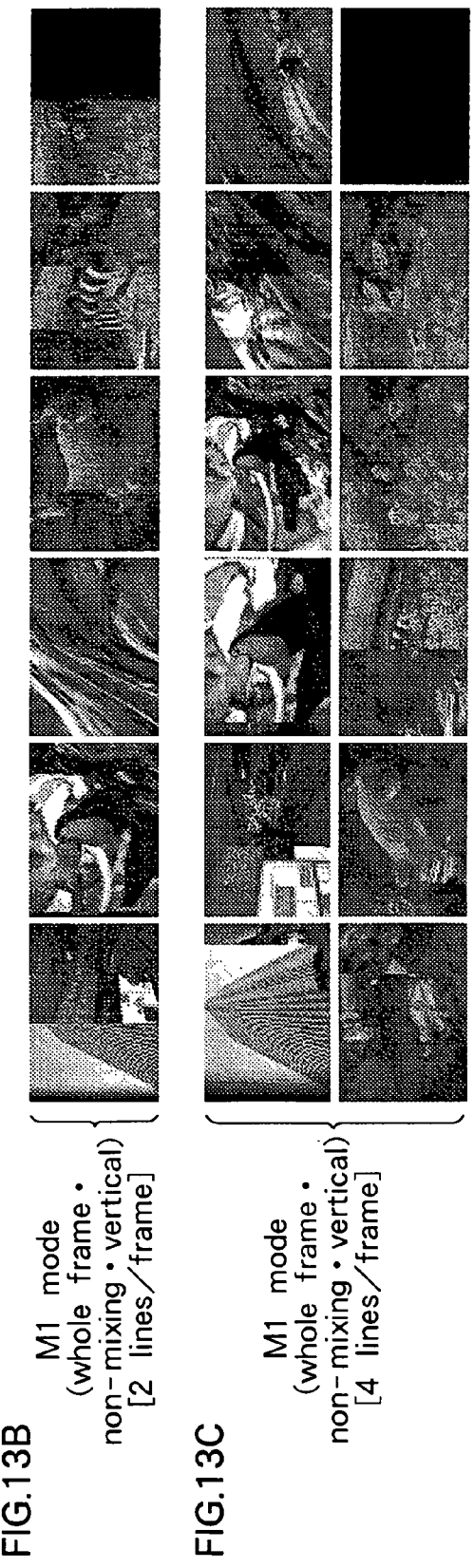

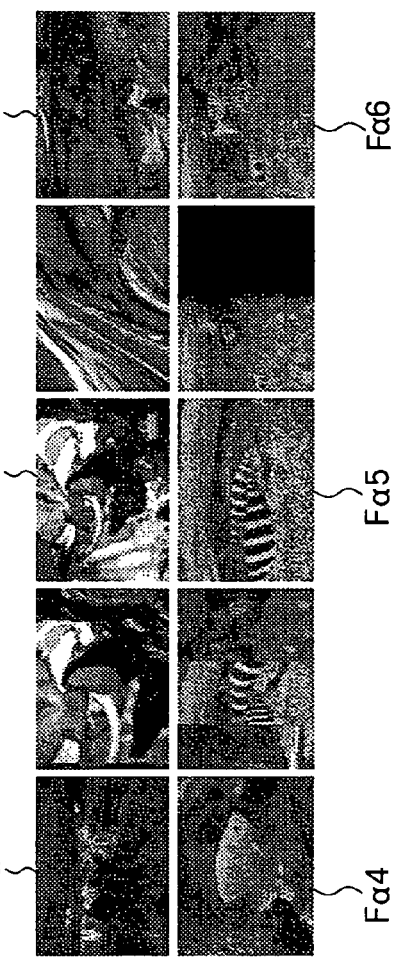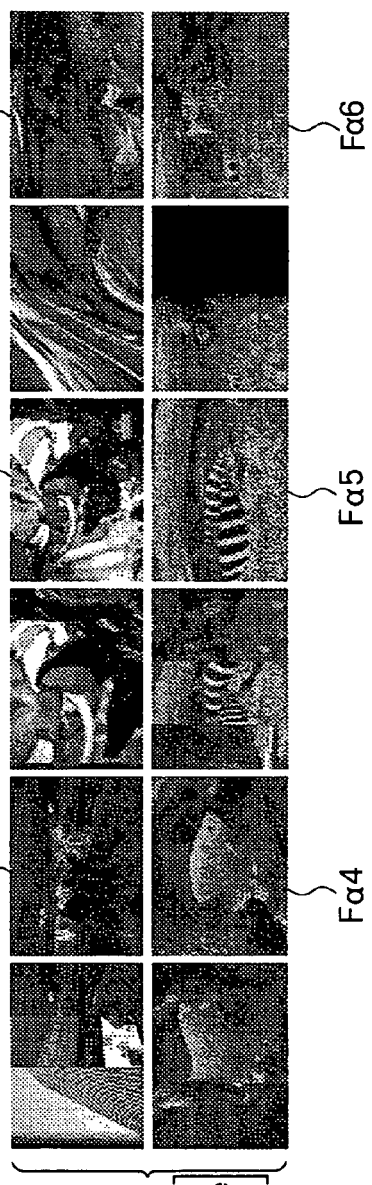
FIG.14A  M2 mode (whole frame · non-mixing · holizontal) [2 lines/frame]
FIG.14B  M5 mode (partial frame · non-mixing · vertical) [2 lines/frame 70% from central part]
FIG.14C  M3 mode (whole frame · mixing · vertical) 2 lines/frame [Extract insertion frame every 5 seconds]

| Database server | Web server | Terminal device | Moving picture server |
|---|---|---|---|
| | | activate Internet browser unit (S1) | |
| | | access web server (S2) | |
| | read homepage for moving picture retrieval from GUI data storing unit and distribute it to terminal device (S3) | | |
| | | display homepage for moving picture retrieval (S4) | |
| | | enter keyword (S5) | |
| | | transmit keyword together with moving picture retrieval request to web server (S6) | |
| | activate database searching unit and transmit moving picture information retrieval command code together with keyword to database server (S7) | | |
| retrieve moving information and transmit retrieval result to web server (S8) | | | |
| | activate index retrieving unit and retrieve corresponding VD index file from index storing unit on the basis of retrieval result from database server (S9) | | |
| | generate GUI data on the basis of retrieval result from database server and retrieval result from index storing unit (S10) | | |
| | transmit GUI data as retrieval result to terminal device (S11) | | |
| | | display GUI data on browser (S12) | |

FIG.15

| Database server | Web server | Terminal device | Moving picture server |
|---|---|---|---|
| | capture requested index representative still picture from still picture storing unit and transmit it to terminal device (S15) | obtain information specifying mouse-pointed VD index picture (S13) | |
| | | transmit transmission request of index representative still picture together with index specifying information to web server (S14) | |
| | | receive index representative still picture and display it on browser (S16) | |
| | | obtain information specifying mouse-clicked VD index picture (S17) | |
| | generate moving picture reproduction command code including moving picture file name, moving picture file storing position, reproduction start position and the like on the basis of received VD index specifying information and transmit it to terminal device (S19) | transmit transmission request of moving picture reproduction command code together with VD index specifying information to web server (S18) | |
| | | receive moving picture reproduction command code and request moving picture server to distribute moving picture on the basis of the code (S20) | distribute corresponding moving picture to terminal device on the basis of moving picture reproduction command code (S21) |
| | | display distributed moving picture on browser (S22) | |

FIG.16

IMAGE GENERATING APPARATUS AND METHOD

This is a continuation of Application No PCT/JP98/04192, filed Sep. 17, 1998.

TECHNICAL FIELD

The present invention relates to an image generating apparatus capable of generating an index picture as a still picture showing an outline of a moving picture. For example, the invention relates to an image generating apparatus applied to a system of retrieving a desired moving picture from a plurality of kinds of moving pictures.

BACKGROUND ART

Conventionally, an information retrieving technique intended for characters has been widely used. However, with respect to a retrieving technique intended for video image, there are few realized examples and various attempts are still being made at present. Among them, moving picture retrieving methods such as a method using an image recognizing technique, a method using a scene extracting technique, and the like have been being studied from various viewpoints.

For example, in a VOD (Video On Demand) system in which a moving picture server and a database server are combined, the contents (of a moving picture) can be retrieved by a keyword retrieval of a title name or the like. The title name, however, does not always properly express the contents. Under the present circumstances, in many cases, the contents can be recognized as a result from playing them back.

In order to solve the problem, as disclosed in Japanese Unexamined Patent Application No. 2-260075, the applicant of the invention has proposed a video browser technique with a view to showing a moving picture so as to be recognized at sight. According to the video browser technique, index pictures as so-called digest still pictures are generated on the basis of partial images sampled from a series of still pictures which form a moving picture through a moving slit window and are listed in accordance with the time, thereby enabling the rough contents of the moving picture to be recognized at a glance.

By the video browser technique, since the contents of a moving picture of an enormous amount recorded in an invisible state are displayed in the form of still pictures compressed according to the time, the contents of the moving picture can be immediately grasped.

In the above-mentioned publication regarding the video browser technique, however, only the method of using a slit window moving in the vertical direction or a slit window moving in the horizontal direction is disclosed as a method of sampling partial images through a moving slit window from a series of still pictures constructing a moving picture. An index picture cannot be generated in proper, various modes according to the kind and use of the material (moving picture), the condition of a system configuration, and the like.

DISCLOSURE OF INVENTION

The invention has been achieved in consideration of the problem and its object is to provide an image generating apparatus and method capable of generating an index picture as still picture obtained by summarizing the contents of a moving picture in various modes.

According to the invention, there is provided an image generating apparatus comprising index picture generating means for generating an index picture as a still picture representing the contents of a moving picture in a summarized manner by combining parts from each of a plurality of still pictures arranged in time sequence so as to construct the moving picture, wherein the index picture generating means has the function of extracting a part from each of the plurality of still pictures in a plurality of different modes and generating an index picture according to each mode on the basis of the extracted parts.

In the image generating apparatus of the invention, the plurality of different modes can include a mode of extracting a partial image elongated in the vertical direction from each of the plurality of still pictures.

In the image generating apparatus of the invention, the plurality of different modes can include a mode of extracting a partial image elongated in the horizontal direction from each of the plurality of still pictures.

In the image generating apparatus of the invention, the plurality of different modes can include a mode of extracting a part from a limited area of each of the plurality of still pictures. In this case, it is suitable that the limited area is a central area in each of the plurality of still pictures.

In the image generating apparatus of the invention, the index picture forming means further can have a function of extracting some of the plurality of still pictures and using the extracted still pictures also as index pictures.

According to the invention, there is provided an image forming method for forming an index picture as a still picture representing the contents of a moving picture in a summarized form by combining parts taken from each of a plurality of still pictures arranged in time sequence so as to construct the moving picture, comprising the steps of: selecting any of a plurality of different modes for extracting a part from each of the plurality of still pictures; extracting a part from each of the plurality of still pictures in accordance with the selected mode; and generating an index picture by combining the extracted parts.

In the image generating method of the invention, the plurality of different modes can include a mode of extracting a partial image elongated in the vertical direction from each of the plurality of still pictures.

In the image generating method of the invention, the plurality of different modes can include a mode of extracting a partial image elongated in the horizontal direction from each of the plurality of still pictures.

In the image generating method of the invention, the plurality of different modes can include a mode of extracting a part from a limited area of each of the plurality of still pictures. In this case, it is suitable that the limited area is a central area in each of the plurality of still pictures.

In the image generating method of the invention, some of the plurality of still pictures are extracted and used also as index pictures.

According to the image generating apparatus of the invention, by the index picture generating means, an index picture as a still picture representing the contents of a moving picture in a summarized manner is formed by combining parts taken from a plurality of still pictures arranged in time sequence so as to construct the moving picture. The process of generating the index picture is performed in a plurality of different modes.

According to the image generating method of the invention, any of a plurality of different modes for extracting a part from each of the plurality of still pictures is selected, a part is extracted from each of the plurality of still pictures in accordance with the selected mode, and an index picture is generated by combining the extracted parts.

Other and further objects, features and advantages of the invention will appear more fully from the following description.

BRIEF DESCRIPTION OF DRAWINGS

FIGS. 5A to 5C are explanatory diagrams showing the schematic procedure of forming a group of VD index pictures from a series of moving pictures.

FIGS. 6A to 6D are explanatory diagrams showing a procedure of forming one VD index picture from moving pictures in a certain period by a vertical extraction method.

FIGS. 8A to 8E are explanatory diagrams showing a procedure of forming one VD index picture from moving pictures in a certain period by a partial extraction method.

FIG. 10 is an explanatory table showing the kinds of index forming modes supported by an index forming unit shown in FIG. 1.

FIGS. 13A to 13C are representations showing three examples of VD index pictures generated with various number of lines to be extracted per frame in M1 mode.

FIGS. 14A to 14C are representations showing three examples of VD index pictures generated in M2, M5, and M3 modes under the condition that the number of lines extracted per frame is fixed.

FIG. 15 is an explanatory diagram showing a series of moving picture retrieving and distributing operations in each of the web server, terminal device, moving picture server and database server.

FIG. 16 is an explanatory diagram continued from FIG. 15.

BEST MODE FOR CARRYING OUT THE INVENTION

Figure 1:
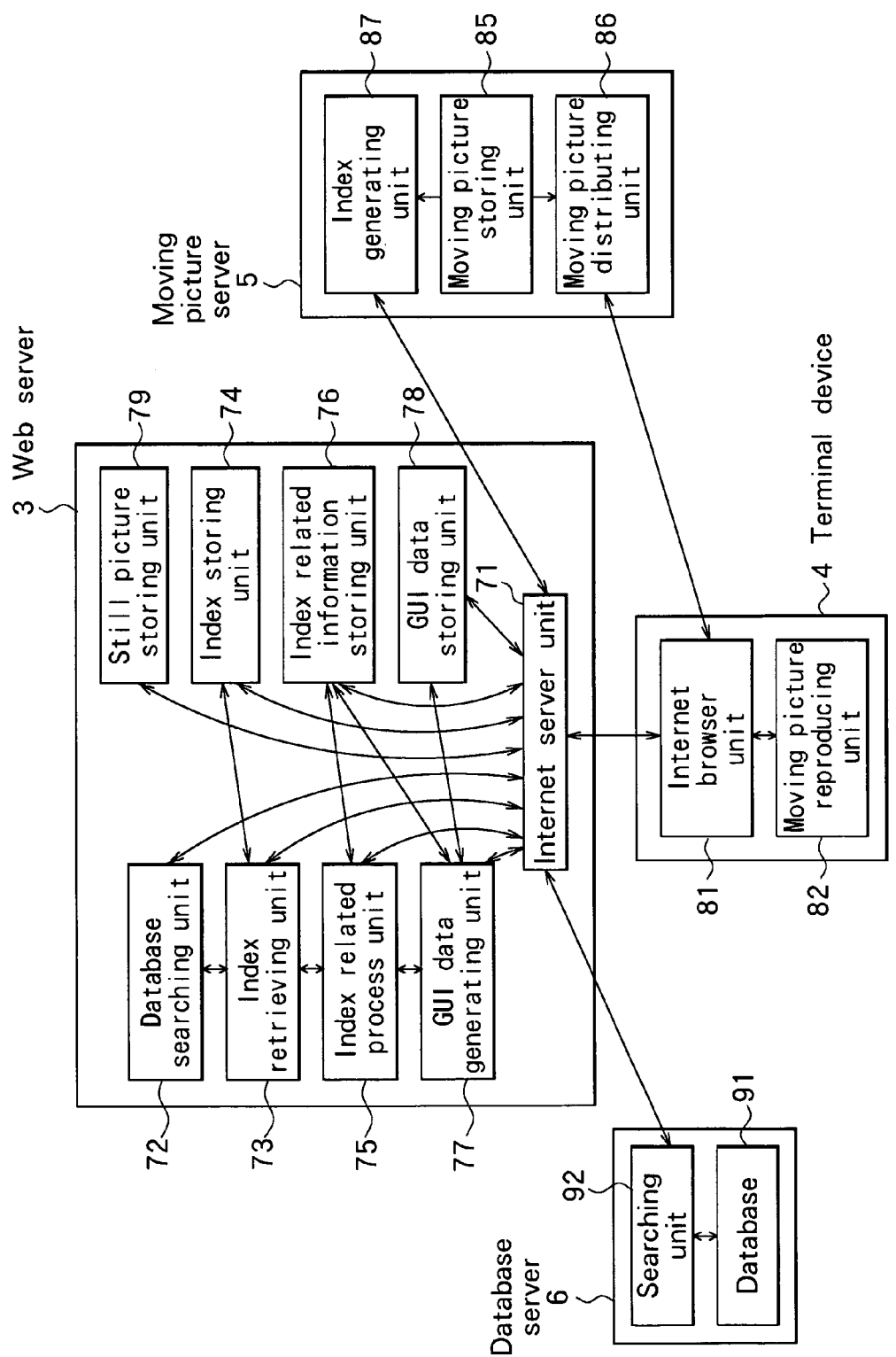
FIG. 1 is a block diagram showing the functional configuration of components in a moving picture retrieving and distributing system to which an image forming apparatus of an embodiment of the invention is applied.

Embodiments of the invention will be described in detail hereinbelow by referring to the drawings.

Figure 2:
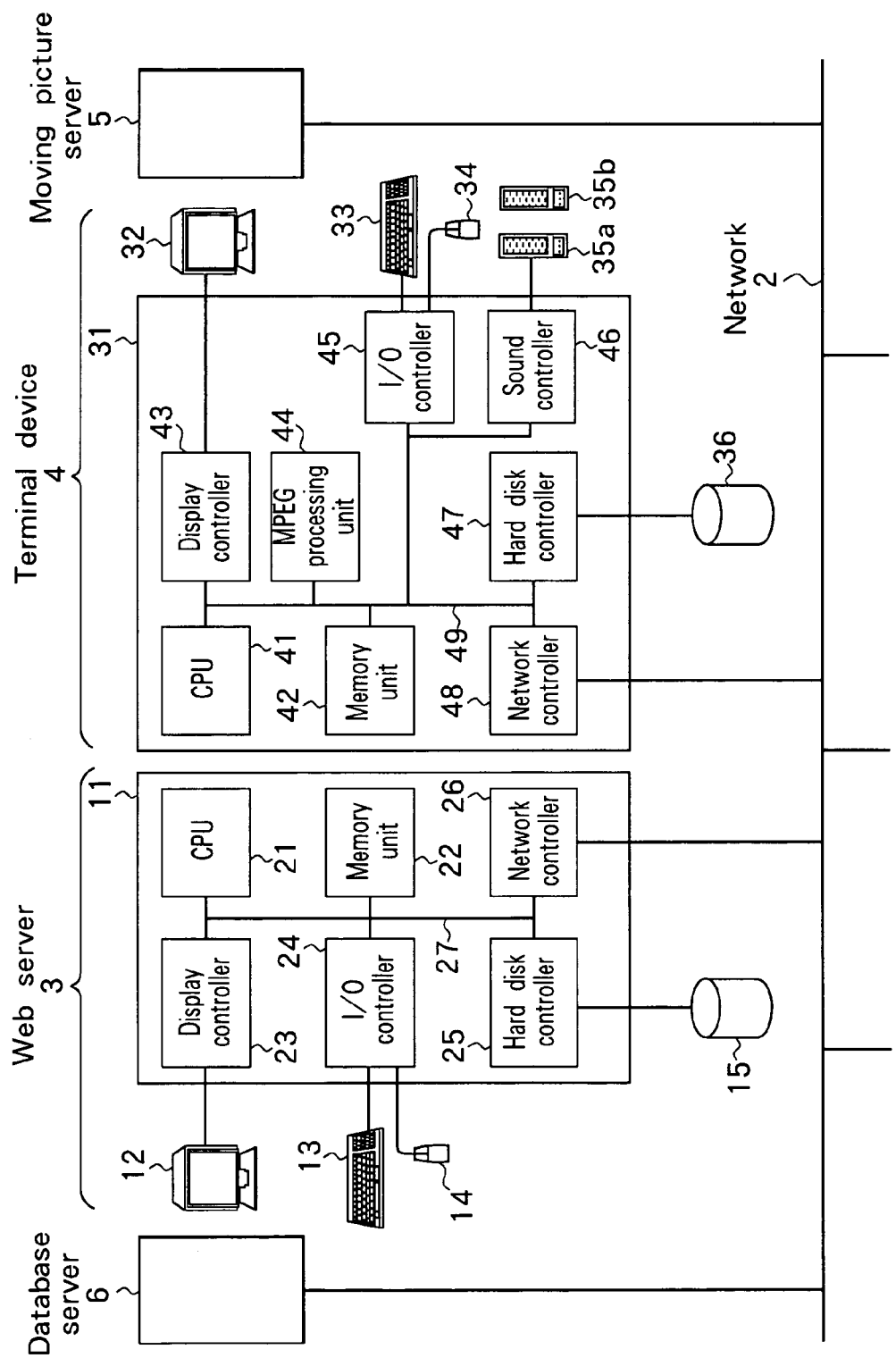
FIG. 2 is a block diagram showing the hardware configuration of the moving picture retrieving and distributing system together with the hardware configuration of a web server and a terminal device as components of the system.

FIG. 2 shows a hardware configuration of a moving picture retrieving and distributing system to which an image generating apparatus according to an embodiment of the invention is applied, together with internal configurations of a web server 3 and a terminal device 4 as components of the system. The moving picture retrieving and distributing system of the embodiment is a system capable of retrieving and distributing a moving picture by using the world wide web (WWW) as a system which makes an access to information on the Internet possible.

As shown in the diagram, the moving picture retrieving and distributing system comprises the web server 3 for supporting the WWW, the terminal device 4 as a client, a moving picture server 5 for storing a moving picture, and a database server 6 for storing data which is related to the moving picture stored in the moving picture server 5. Each of the components is connected to a network 2 as a part of the Internet. The number of each of the web server 3, terminal device 4, moving picture server 5 and database server 6, connected to the network 2, and the physical connection form of the components to the network 2 are not especially limited.

The web server 3 mainly retrieves a moving picture or retrieves and distributes visual digest index pictures (hereinbelow, referred to as VD index pictures) as still pictures generated from a moving picture in accordance with a request from the terminal device 4. The VD index pictures are obtained by summarizing the contents of the moving picture into the form of still pictures. Only by seeing the VD index pictures, the rough contents of the moving picture can be grasped. The forming method will be described hereinlater. The VD index picture corresponds to an example of an "index picture" in the invention.

As shown in FIG. 2, the web server 3 comprises a computer unit 11, and a display apparatus 12, a keyboard 13, a mouse 14 and a hard disk drive 15, which are connected to the computer unit 11. The computer unit 11 comprises a CPU (central processing unit) 21, a memory unit 22 including a ROM (read only memory) and a RAM (random access memory), a display controller 23 for controlling the display apparatus 12, an I/O controller 24 connected to the keyboard 13 and the mouse 14, for controlling an input/output (I/O) operation, a hard disk controller 25 for controlling the hard disk drive 15, and a network controller 26 connected to the network 2, for controlling communications. The components are connected to each other via a bus 27. The CPU 21 executes an application program stored in the hard disk drive 15 by using the RAM in the memory unit 22 as a working memory area.

The terminal device 4 is, an ordinary personal computer, for example, and has an Internet browser as software which makes information on the Internet browsable and a moving picture reproducing program as software for enabling a moving picture distributed via the network 2 to be reproduced. As the Internet browser, for instance, a general commercial browser such as Netscape Navigator (trademark of Netscape Communications, U.S.A.) can be used.

As shown in FIG. 2, the terminal device 4 comprises a computer unit 31, and a display apparatus 32, a keyboard 33, a mouse 34, speakers 35a and 35b, and a hard disk drive 36, which are connected to the computer body 31. The computer body 31 comprises: a CPU 41; a memory unit 42 including a ROM, a RAM and the like; a display controller 43 for controlling the display apparatus 32; an MPEG processing unit 44 for compressing and decompressing image data in compliance with the MPEG (Moving Picture Experts Group) standard; an I/O controller 45 connected to the keyboard 33 and the mouse 34, for controlling an input/output operation; a sound controller 46 for controlling sound outputs from the speakers 35*a* and 35*b*; a hard disk controller 47 for controlling the hard disk drive 36; and a network controller 48 connected to the network 2, for controlling communications. The components are connected to each other via a bus 49. The CPU 41 executes an application program stored in the hard disk drive 36 by using the RAM in the memory unit 42 as a working memory area. The MPEG processing unit 44 can be realized by either hardware or software.

As long as the Internet browser function and the moving picture reproducing function as described above are provided, the terminal device 4 has no limits on hardware.

The moving picture server 5 stores a plurality of kinds of moving pictures, provides the moving picture via the network 2 in response to a request, and generates a VD index picture from a moving picture.

Figure 3:
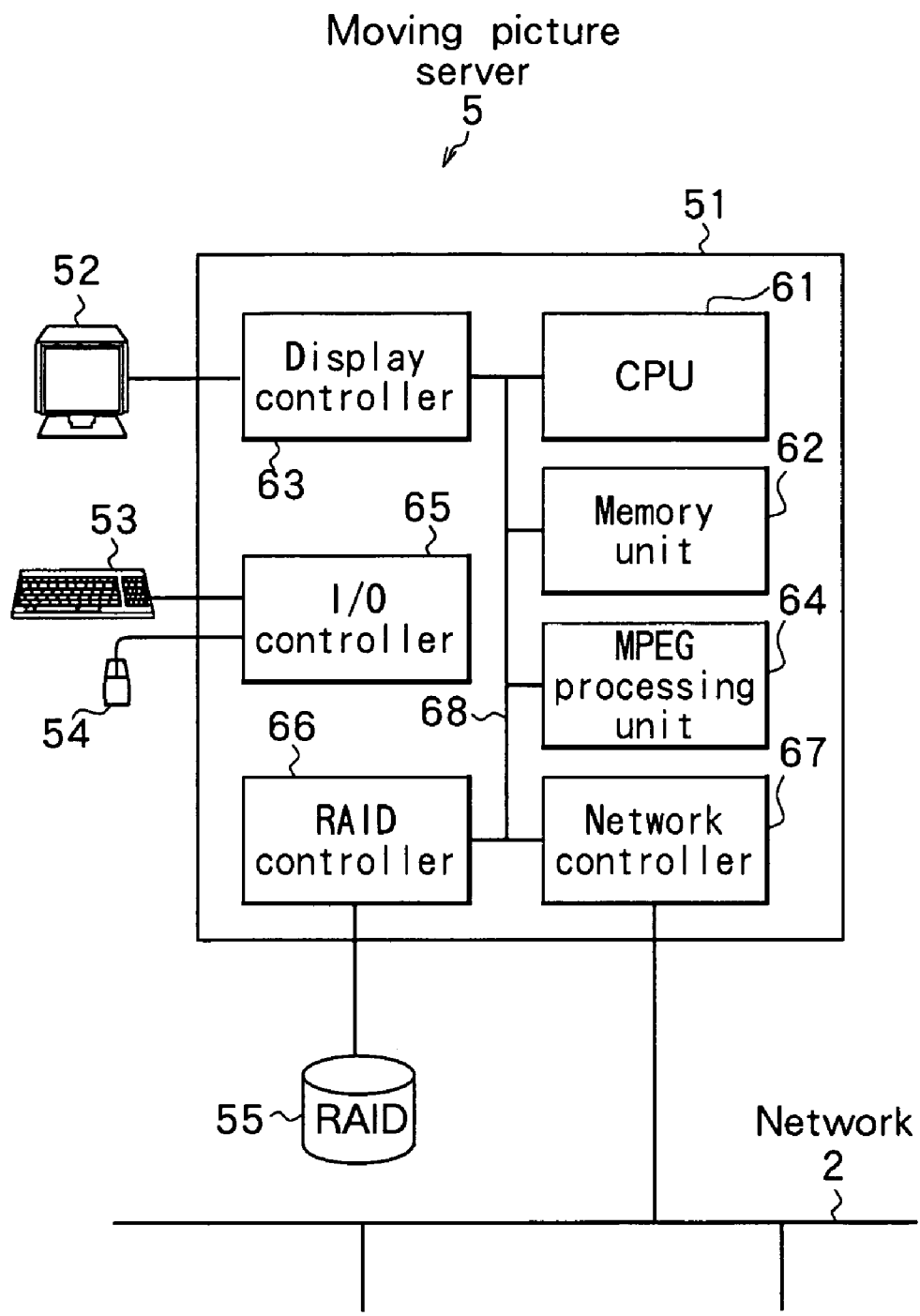
FIG. 3 is a block diagram showing the hardware configuration of a moving picture server.

FIG. 3 shows the hardware configuration of the moving picture server 5. As shown in the diagram, the moving picture server 5 comprises a computer unit 51, and a display apparatus 52, a keyboard 53, a mouse 54, and a RAID (Redundant Array of Inexpensive Disks) 55 of a large capacity redundantly constructed by using a plurality of hard disks. The components 52 to 55 are connected to the computer unit 51.

The computer unit 51 comprises: a CPU 61; a memory unit 62 including a ROM and a RAM and the like; a display controller 63 for controlling the display apparatus 52; an MPEG processing unit 64 for compressing and decompressing image data in compliance with the MPEG standard; an I/O controller 65 connected to the keyboard 53 and the mouse 54, for controlling an input/output operation; a RAID controller 66 for controlling the RAID 55; and a network controller 67 connected to the network 2, for controlling communications. The components are connected to each other via a bus 68. The CPU 61 executes an application program stored in the RAID 55 by using the RAM in the memory unit 62 as a working memory area. The MPEG processing unit 64 may be realized by either hardware or software.

The functional configuration of the moving picture retrieving and distributing system of the embodiment will now be described.

FIG. 1 shows the functional configuration of components in the moving picture retrieving and distributing system shown in FIG. 2. As shown in the diagram, the web server 3 has an Internet server unit 71, a database searching unit 72, an index retrieving unit 73, an index storing unit 74, an index related process unit 75, an index related information storing unit 76, a GUI (Graphycal User Interface) data generation unit 77, a GUI data storing unit 78, and a still picture storing unit 79.

The Internet server unit 71 is used to, for instance, manage and distribute information to be made public on the Internet. Specifically, the Internet server unit 71 transmits/receives signals to/from the terminal device 4, the moving picture server 5, the database server 6 and the like.

The database searching unit 72 performs processes of forming a moving picture retrieval request to the database server 6 in accordance with a request from the terminal device 4 and transferring the obtained retrieval result to the index retrieving unit 73. The retrieval result includes the title of the corresponding moving picture, the file name of moving picture data, the name of the moving picture server in which the moving picture file is stored (the moving picture server 5 in this case), and a storage position of the moving picture file in the moving picture server.

The index retrieving unit 73 retrieves a target file from the plurality of VD index files stored in the index storing unit 74 on the basis of the database search result received from the database searching unit 72. As will be described hereinlater, the VD index file is an image data file generated every title of a moving picture and includes one or a plurality of VD index picture data.

The index storing unit 74 stores the VD index file sent from the moving picture server 5.

The index related process unit 75 performs a process of obtaining various display parameter information related to a display form of the VD index pictures, necessary for the GUI data forming unit 77 to generate GUI data. The display parameter information includes, for example, the number of displayable VD index pictures according to the size of the Internet browser screen (hereinbelow, simply called a browser screen) of the display apparatus 32 of the terminal device 4, numbers of the VD index pictures to be selected when the number of generated VD index pictures exceeds the number of displayable images, a display form of the VD index pictures according to the length of the moving picture, and the like. The VD index picture display form is used by selectively using a part of the area in which the VD index pictures can be displayed according to the length of the moving picture. The user of the terminal device 4 can therefore recognize the length of the corresponding moving picture only by seeing the VD index picture display form displayed on the browser screen of the display apparatus 32.

The index related information storing unit 76 stores index related information sent from the moving picture server 5. The index related information includes the number of VD index pictures generated by the index forming unit 87 in the motion picture server 5 and various generation parameters used to generate the VD index picture. The generation parameters include, for example, the number of frames used to generate one VD index picture, the number of lines extracted from each frame, the direction of line extraction, and the like. The details will be described hereinlater.

The GUI data forming unit 77 generates or updates GUI data forming a moving picture retrieval homepage provided to the terminal device 4 or the like. The data used to make the moving picture retrieval homepage is usually described in HTML (Hyper Text Markup Language).

The GUI data storing unit 78 is an area for storing the GUI data generated by the GUI data forming unit 77.

The still picture storing unit 79 stores a still picture file sent with the VD index file from the moving picture server 5. The still picture file is made by data of still pictures each of which is made associated with each of VD index pictures included in the VD index file. As the still picture data, for example, data compressed in the GIF (Graphics Interchange Format) is employed.

Among the functional units in the web server 3, the Internet server unit 71, database searching unit 72, index retrieving unit 73, index related process unit 75, and GUI data forming unit 77 are realized mainly by an application program stored in the hard disk drive 15 and the CPU 21 for executing the application program in FIG. 2. Each of the index storing unit 74, index related information storing unit 76, GUI data storing unit 78, and still picture storing unit 79 is realized by using a part of the hard disk drive 15 in FIG. 2.

The terminal device 4 has an Internet browser unit 81 and a moving picture reproducing unit 82.

The Internet browser unit 81 has a function of accessing the Internet by using the WWW and receiving and displaying information. As mentioned above, it is realized by a general commercial browser such as the Netscape Navigator.

The moving picture reproducing unit 82 decompresses the moving picture data distributed from the moving picture server 5 and displays the decompressed image. The moving picture reproducing unit 82 is mainly realized by the MPEG processing unit 44 in FIG. 2. The function of the moving picture reproducing unit 82 can be also realized by a program for reproducing a moving picture adapted to the contents type (for example, compression method) of the moving picture. The program for reproducing a moving picture is provided as, for example, plug-in software of the Internet browser.

The moving picture server 5 has a moving picture storing unit 85, a moving picture distributing unit 86 and the index generation unit 87.

The moving picture storing unit 85 is a part for storing a moving picture file and is realized mainly by the RAID 55 in FIG. 3. The moving picture data included in the moving picture file is compressed in the MPEG format.

The moving picture distributing unit 86 takes a target moving picture from the moving picture storing unit 85 in response to a request from the terminal device 4 or the like and distributes the target moving picture to the terminal device 4 via the network 2. The moving picture distributing unit 86 is realized by mainly the network controller 67 and the CPU 61.

The index generation unit 87 has the function of forming VD index pictures as still pictures by visually summarizing the contents of the moving picture stored in the moving picture storing unit 85 and transmitting the VD index pictures as a VD index file to the web server 3 through the network 2. The index generation unit 87 also has the function of transmitting the number of generated VD index pictures, various generation parameters used to generate the VD index picture, and the like as index related information to the web server 3. The VD index file and index related information sent to the web server 3 is stored in the index storing unit 74 and the index related information storing unit 76, respectively. The index generation unit 87 is realized mainly by the CPU 61 and the MPEG processing unit 64 in FIG. 3. The details of the process of generating the VD index picture will be described hereinlater. The index generation unit 87 corresponds to an example of "index picture forming means" in the invention.

The database server 6 has a database 91 and a searching unit 92.

The database 91 includes the title of a moving picture, the file name of the moving picture, the name of a moving picture server storing the moving picture file (in this case, the moving picture server 5), and the storing position of the moving picture file in the moving picture server.

The searching unit 92 searches the database 91 on the basis of a given keyword in response to a request from the database searching unit 72 in the web server 3 and transmits the search result to the database searching unit 72. The searching unit 92 is realized by, for example, a Database Management System (DBMS) program such as Sybase (trademark of Sybase Inc., U.S.A.).

Figure 4:
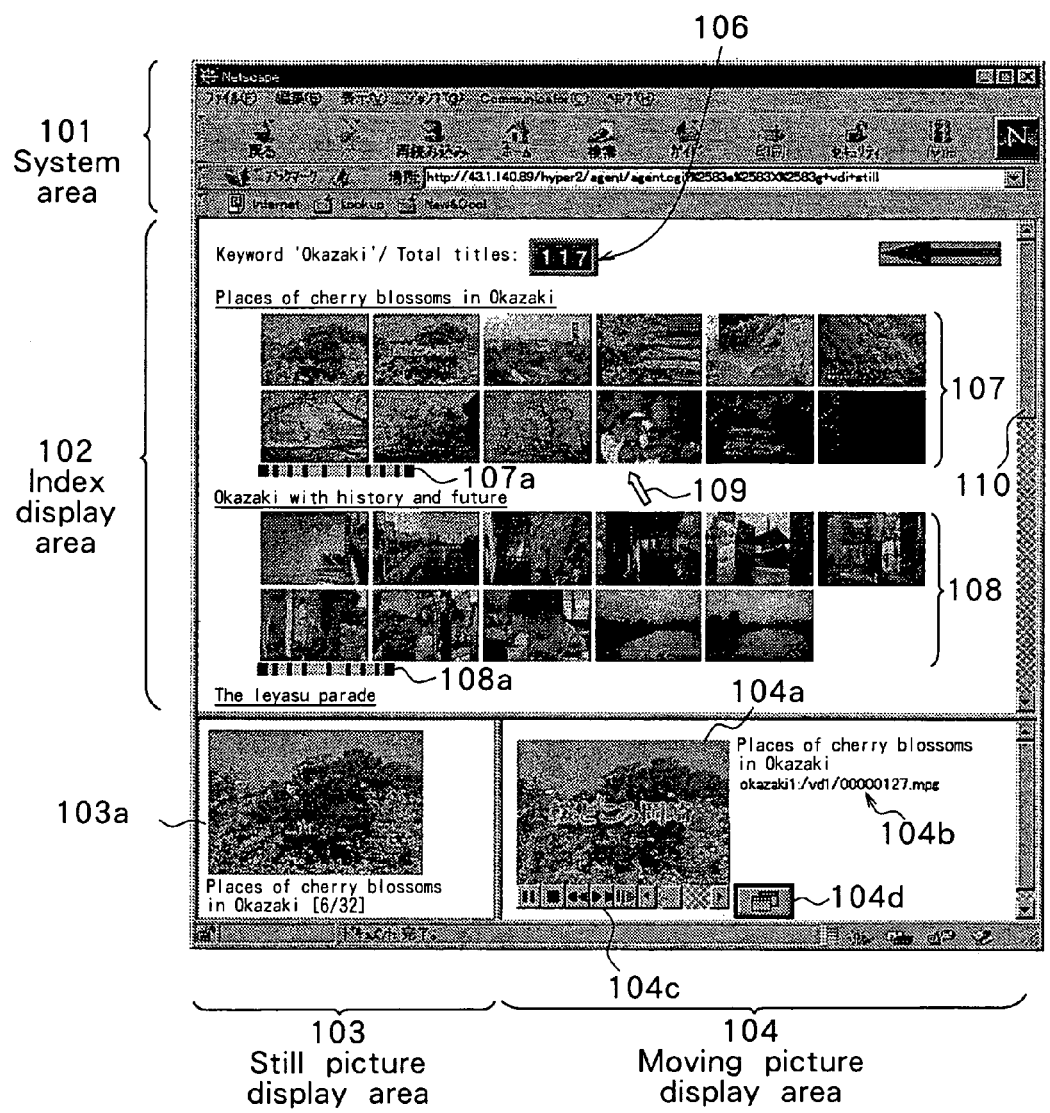
FIG. 4 is a representation showing an example of an Internet browser screen displayed on a display apparatus of the terminal device.

FIG. 4 shows an example of the Internet browser screen displayed on the display apparatus 32 of the terminal device 4. The browser screen is realized by the function of the Internet browser unit 81.

The browser screen includes a system area 101 comprising a browser title bar, a menu bar, a tool bar and so on, an index display area 102 for displaying the VD index pictures as the retrieval result and the like, a still picture display area 103 for displaying a still picture (to be accurate, an index representative still picture which will be described hereinlater), and a moving picture display area 104 for reproducing and displaying a moving picture.

The menu bar in the system area 101 has menu items such as "file", "edit", "display", and so on. By mouse clicking a menu item, a pull-down menu is displayed. In the tool bar, tool icons such as "back" and "refresh" are arranged. By mouse clicking a tool icon, a corresponding browser operation is performed. The mouse click denotes, clicking of the left button of the mouse 34 for example, in a state where a mouse pointer 109 is on the target item. In the following description, the operation will be simply described as a click.

In the index display area 102, the keyword used for retrieval, the number 106 of titles of the moving pictures retrieved, VD index picture groups 107 and 108 of the retrieved moving pictures, and the like are displayed. In the example shown in the diagram, 117 moving pictures are retrieved for the keyword 'Okazaki'. Among them, the VD index picture groups 107 and 108 of the moving pictures of the titles of 'places of cherry blossoms in Okazaki' and 'Okazaki with history and future' are displayed. One VD index picture group corresponds to the moving pictures of one title. Indicator bars 107a and 108a each corresponding to the length of all the corresponding moving pictures (total reproduction time) are disposed below the VD index picture groups. Black frame parts in the indicator bars 107a, 108a, and the like indicate the places of the VD index pictures displayed above among all the VD index pictures. In the index display area 102, by operating a scroll bar 110 at the right end, a plurality of VD index picture groups can be scrolled in the vertical direction and sequentially displayed.

In the still picture display area 103, a still picture 103a corresponding to the selected one of the VD index pictures displayed in the index display area 102 is displayed. The still picture 103a is an index representative still picture which will be described hereinlater. In the embodiment, for example, only by moving the mouse pointer 109 onto a desired VD index picture by operating the mouse 34, the VD index picture is selected.

In the moving picture display area 104, a moving picture 104a corresponding to the selected one of the VD index pictures displayed in the index display area 102 is displayed together with the title name and a moving picture file name 104b. In the embodiment, for example, by moving the mouse pointer 109 onto a desired VD index picture and clicking the mouse button, the moving picture corresponding to the VD index picture is selected. The reproduction start point in this case is the head of a moving picture period corresponding to the clicked VD index picture. Alternatively, any point except for the head of the moving picture period can the reproduction start point. Operations of reproduction, stop, pause, high-speed reproduction, reverse reproduction, high-speed reverse reproduction, and the like of the moving picture 104a can be performed by an operating unit 104c. By clicking an enlargement display icon 104d, the moving picture 104a can be enlarged and displayed on the full browser screen.

The operation of the moving picture retrieving and distributing system with the configuration will now be described.

Referring to FIGS. 5A to 9C, first, some VD index picture forming methods executable by the index forming unit 87 in the moving picture server 5 will be described. Basically, there are four VD index picture forming methods, i.e., a vertical extraction method, a horizontal extraction method, a partial extraction method and a frame mixing method. Each of the methods will be described hereinbelow.

FIGS. 5A to 5C and FIGS. 6A to 6C conceptually show processes of forming VD index pictures by the vertical extraction method. FIGS. 5A to 5C show a rough procedure of forming a plurality of VD index pictures from a series of moving pictures. FIGS. 6A to 6C show a procedure of forming one VD index picture from moving pictures in a certain period.

As shown in FIGS. 5A and 6A, a moving picture is defined as a rectangular parallelepiped model in which two-dimensional still pictures F are arranged along the time-axis (t). Hereinafter, the two-dimensional still picture will be also called a frame. For example, in the case of the NTSC (National Television System Committee) system, each frame is comprised of two fields each having a length of 1/60 second, so that one frame has a length of 1/30 second.

As shown in FIG. 5B, the rectangular parallelepiped model formed by a series of moving pictures is divided into a plurality of partial rectangular parallelepipeds Si (in the diagram, i=1 to 4) at predetermined time intervals. Each partial rectangular parallelepiped Si is cut diagonally along its diagonal face passing on a diagonal line A1 of the top face and image information in a slit on each section face (hereinbelow, called slit image information) is extracted. In practice, as shown in FIG. 6B, frames Fj (j=1, 2, . . . ) are extracted from one partial rectangular parallelepiped. Further, as shown in FIG. 6C, slit image information SVLj is sequentially obtained from the frames Fj by using a moving slit window elongated in the vertical direction which moves with time in the horizontal direction.

As shown in FIG. 6D, the slit image information SLVj extracted from the sections is sequentially arranged up to a predetermined size and is subjected to a predetermined compressing process. As shown in FIG. 5C, each of VD index pictures IVi (i=1 to 4) is consequently generated from each partial rectangular parallelepiped Si and a plurality (four in the diagram) of VD index pictures are generated as a whole moving picture. At this time, one frame included in the original partial rectangular parallelepiped Si (that is, the original frame Fj which has not been subjected to the extracting process using the slit window) is correlated with each VD index picture IVi and is registered as an index representative still picture SP. As the index representative still picture SP, for example, a frame provided to generate the center part of the VD index picture IVi (frame F5 in FIG. 6D) is selected. A frame provided to generate another part (such as an end part) of the VD index picture may be also selected.

Such a vertical extraction method is especially effective, for example, in the case where a moving picture as a material is obtained by panning a camera in the horizontal direction for the following reason. In the case of such a material, the direction of transition of frame contents of a moving picture and an arrangement direction of the slit image information SLVi constructing the generated index representative still picture are the horizontal direction and coincide with each other, so that the VD index picture naturally expresses a change in the contents of the moving picture.

The horizontal extraction method will now be described.

FIGS. 7A to 7D show the horizontal extraction method of extracting slit image information SLHj by using a moving slit window elongated in the horizontal direction (lateral direction) and forming a VD index picture.

According to the method, cross sections of the partial rectangular parallelepipeds Si shown in FIG. 5B do not include the diagonal line A1 as mentioned above but include a diagonal line A2 on the front face of the rectangular parallelepiped Si.

Figure 7A:
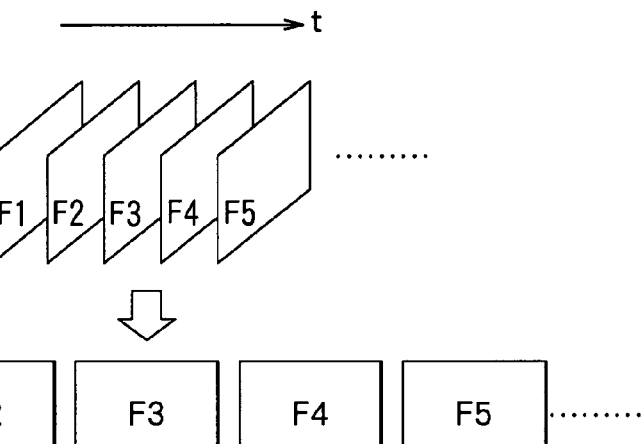
FIGS. 7A to 7D are explanatory diagrams showing a procedure of forming one VD index picture from moving pictures in a certain period by a horizontal extraction method.
Figure 7B:
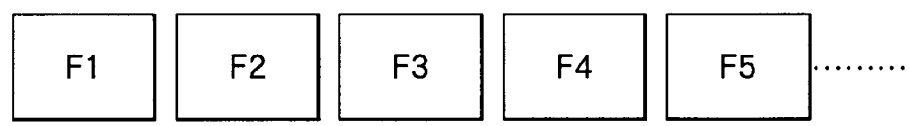
Figure 7C:
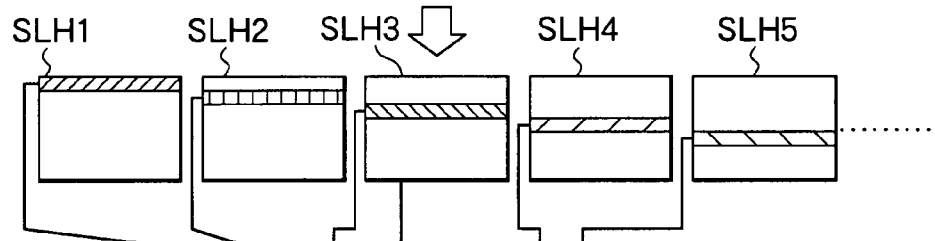

Specifically, as shown in FIGS. 7A and 7B, frames Fj (=1, 2, . . . ) are taken from the partial rectangular parallelepipeds Si (FIG. 5B) and, further, slit image information SLHj is sequentially taken from the frames Fj by using a moving slit window elongated in the horizontal direction which moves with time in the vertical direction.

Figure 7D:
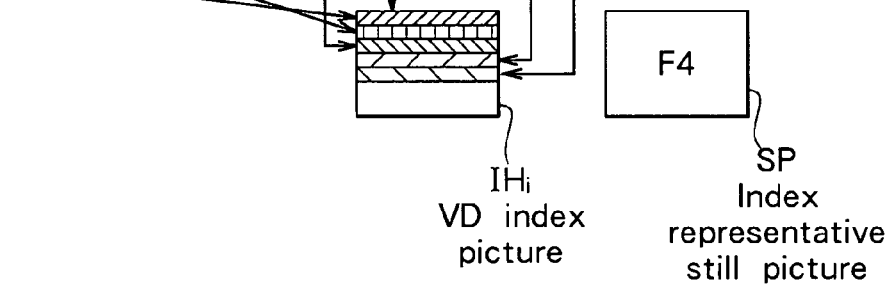

As shown in FIG. 7D, the slit image information SLHj extracted is sequentially arranged up to a predetermined size and is subjected to a predetermined compressing process. Consequently, each of VD index pictures IHi is generated from each partial rectangular parallelepiped and a plurality of VD index pictures are generated from a whole moving picture. At this time, each VD index picture IHi is correlated with a frame Fj (frame F4 in the example of FIG. 7D) included in the original partial rectangular parallelepiped. The frame is registered as an index representative still picture SP.

Such a horizontal extraction method is especially effective, for example, in the case where a moving picture as a material is obtained by panning a camera in the vertical direction for the following reason. In the case of such a material, the direction of transition of frame contents of a moving picture and an arrangement direction of the slit image information SLi constructing the formed index representative still picture are the vertical direction and coincide with each other, so that the VD index picture naturally expresses a change in the contents of the moving picture.

The partial extraction method will now be described.

FIGS. 8A to 8E show the partial extraction method which does not extract the slit image information SLj directly from frames Fj constructing a moving picture but sets only a main part (such as a central area) of the frame Fj as a range to be extracted and puts the other area (such as a peripheral area) out of the extraction target.

According to the method, as shown in FIGS. 8A and 8B, frames Fj (j= 1, 2, . . . ) are taken from the partial rectangular parallelepipeds Si (FIG. 5B) and, further, as shown in FIG. 8C, a partial frame Fj' is extracted from the central part of each frame Fj. The size of the partial frame Fj' is, for example, about 70% of the size of the original frame Fj. The invention is not limited to the value.

As shown in FIG. 8D, slit image information SLVj' is sequentially extracted from each of the partial frame Fj', by using a moving slit window elongated in the vertical direction which moves with time in the horizontal direction.

As shown in FIG. 8E, the slit image information SLVj extracted is sequentially arranged up to a predetermined size and is subjected to a predetermined compressing process. Each of VD index pictures IVi' is consequently generated from each partial rectangular parallelepiped and a plurality of VD index pictures are generated from a whole moving picture. At this time, each VD index picture IVi' is correlated with the partial frame Fj' (partial frame F4' in FIG. 8E) which is extracted from any of the frames Fj included in the original partial rectangular parallelepiped. The frame is registered as an index representative still picture SP.

In such a partial extraction method, even if the width of the moving slit is fixed, the size of slit image information SLVj' (to be specific, image data amount) extracted by using the window is smaller than that of the slit image information SLVj in FIG. 6C. As a result, the size of the VD index picture IVi' formed is smaller than that of the VD index picture IVi in FIG. 6D. It is therefore effective at reducing a storing space of the VD index pictures.

In the example shown in FIGS. 8A to 8E, the case where the partial extraction method is combined with the vertical extraction method has been explained. As will be described hereinlater, the partial extraction method can be also combined with the horizontal extraction method.

A frame mixing method will now be described.

Figure 9A:
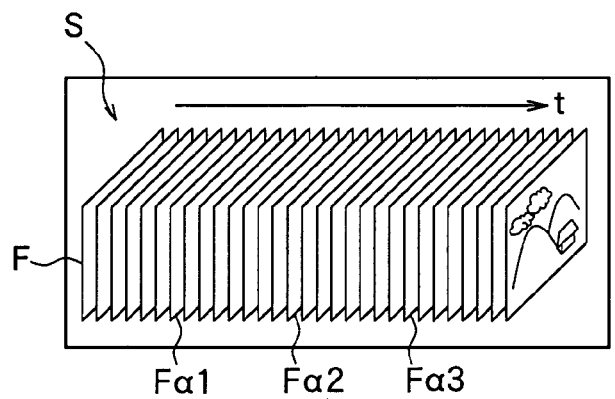
FIGS. 9A to 9c are explanatory diagrams showing a schematic procedure of forming a group of VD index pictures from a series of moving pictures by a frame mixing method.
Figure 9B:
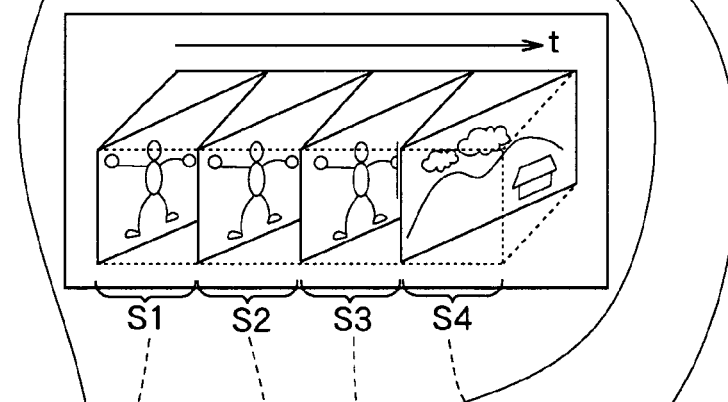
Figure 9C:
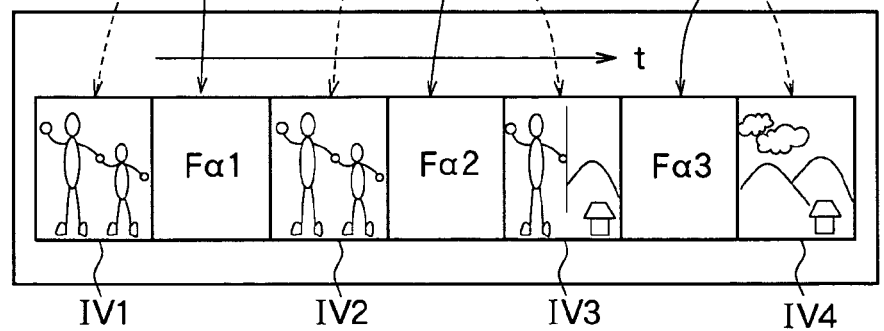

FIGS. 9A to 9C show a frame mixing method in which the original frame is mixed in a group of the formed VD index pictures separately from the index representative still picture. The example shown in the diagram is realized by modifying the vertical extraction method shown in FIGS. 5A to 5C.

According to the method, each partial rectangular parallelepiped Si is cut obliquely along a diagonal face passing the diagonal line of the top face, slit image informations are extracted in each cross section, and a VD index picture IVi is generated on the basis of the extracted slit image information. The above operation is the same as the case of FIGS. 5A to 5C.

In the method, a frame included in each partial rectangular parallelepiped Si is inserted as it is (without being processed) between VD index pictures generated as mentioned above. The frame to be inserted will be described as an insertion frame hereinbelow.

There are various methods of determining the insertion frame and various inserting methods. For example, there is a method of extracting a frame corresponding to the head part of each VD index picture (that is, a frame of providing slit image information at the left end of the VD index picture) and inserting the insertion frame before the VD index picture. According to the method, for example as shown in FIG. 9C, a frame F$\alpha$1 providing slit image information of the left end portion of a VD index picture IV2 is extracted from a partial rectangular parallelepiped S2 (FIG. 9B) and is inserted between VD index pictures IV2 and IV1. Similarly, a frame F$\alpha$2 providing slit image information of the left end portion of a VD index picture IV3 is extracted from a partial rectangular parallelepiped S3 (FIG. 9B) and is inserted between VD index pictures IV3 and IV2. A frame F$\alpha$3 is similarly treated.

The method of determining the insertion frame and the inserting method are not limited to the above. For example, it is also possible to sample frames at predetermined intervals and dispose them at proper positions in the VD index picture arrangement.

In the method, the point of correlating each VD index picture IVi to any one of frames included in the original partial parallelepiped Si and registering the frame as an index representative still picture SP is the same as the case of FIGS. 5A to 5C.

Since an unprocessed still picture is included in the arrangement of the VD index pictures as will be described hereinlater, the frame mixing method has an advantage such that recognition of the contents of a moving picture is further facilitated.

FIG. 10 shows the kinds of forming modes which are for the index generating unit 87 in the moving picture server 5 to form the VD index picture. As shown in the diagram, according to the embodiment, eight forming modes M1 to M8 are available. These modes M1 to M8 are configured by combining four methods, i.e., the vertical extraction method, the horizontal extraction method, the partial extraction method, and the frame mixing method. Each modes denotes as follows.

M1 mode: mode in which only the vertical extraction method is used on a whole frame to be extracted.

M2 mode: mode in which only the horizontal extraction method is used on a whole frame to be extracted.

M3 mode: mode in which both the vertical extraction method and the frame mixing method are used on a whole frame to be extracted.

M4 mode: mode in which both the horizontal extraction method and the frame mixing method are used on a whole frame to be extracted.

M5 mode: mode in which only the vertical extraction method is used on a partial frame to be extracted.

M6 mode: mode in which only the horizontal extraction method is used on a partial frame to be extracted.

M7 mode: mode in which both the vertical extraction method and the frame mixing method are used on a partial frame to be extracted.

M8 mode: mode in which both the horizontal extraction method and the frame mixing method are used on a partial frame to be extracted.

Figure 11:
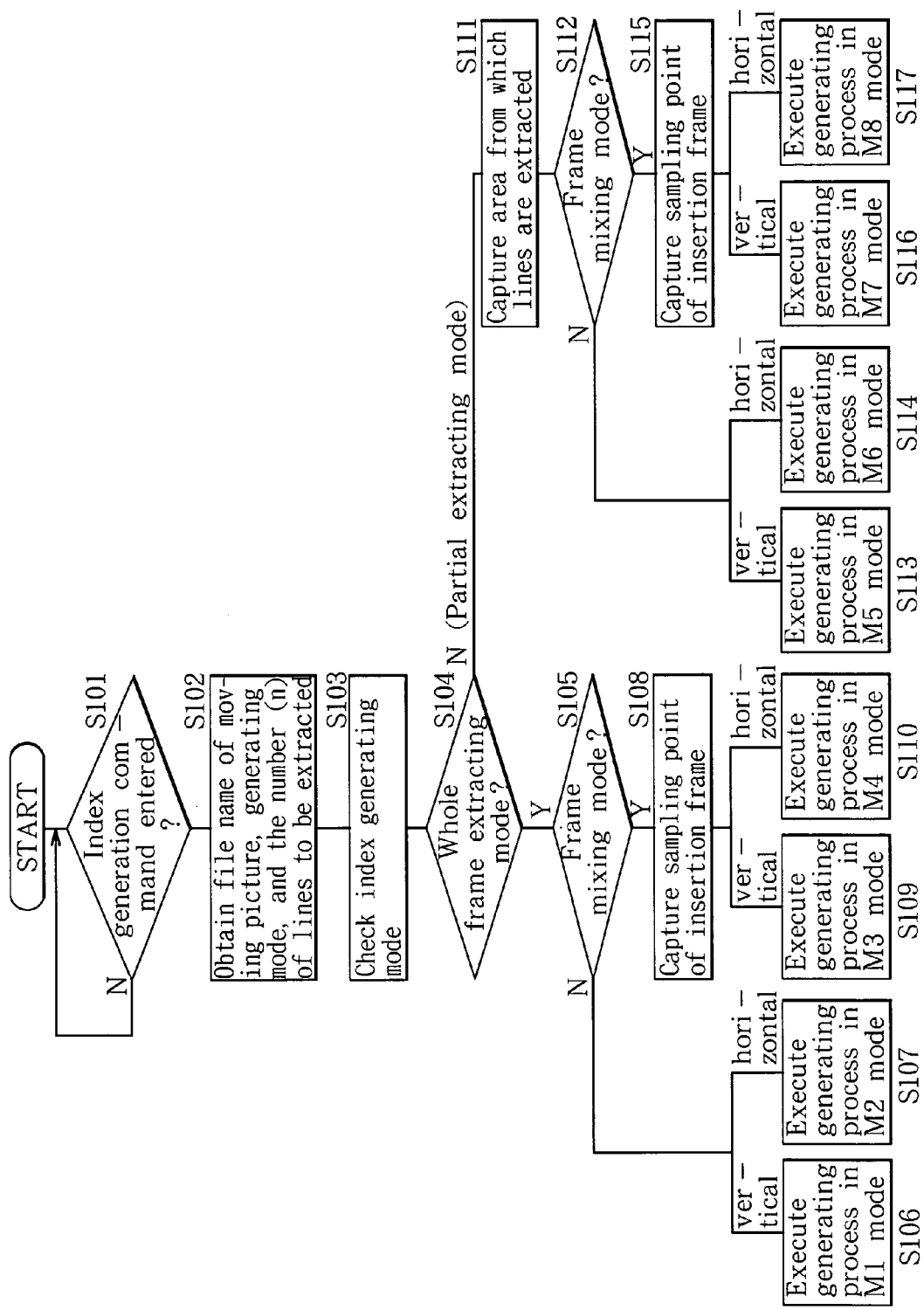
FIG. 11 is a flowchart showing the contents of processes performed by the index forming unit shown in FIG. 1.
Figure 12:
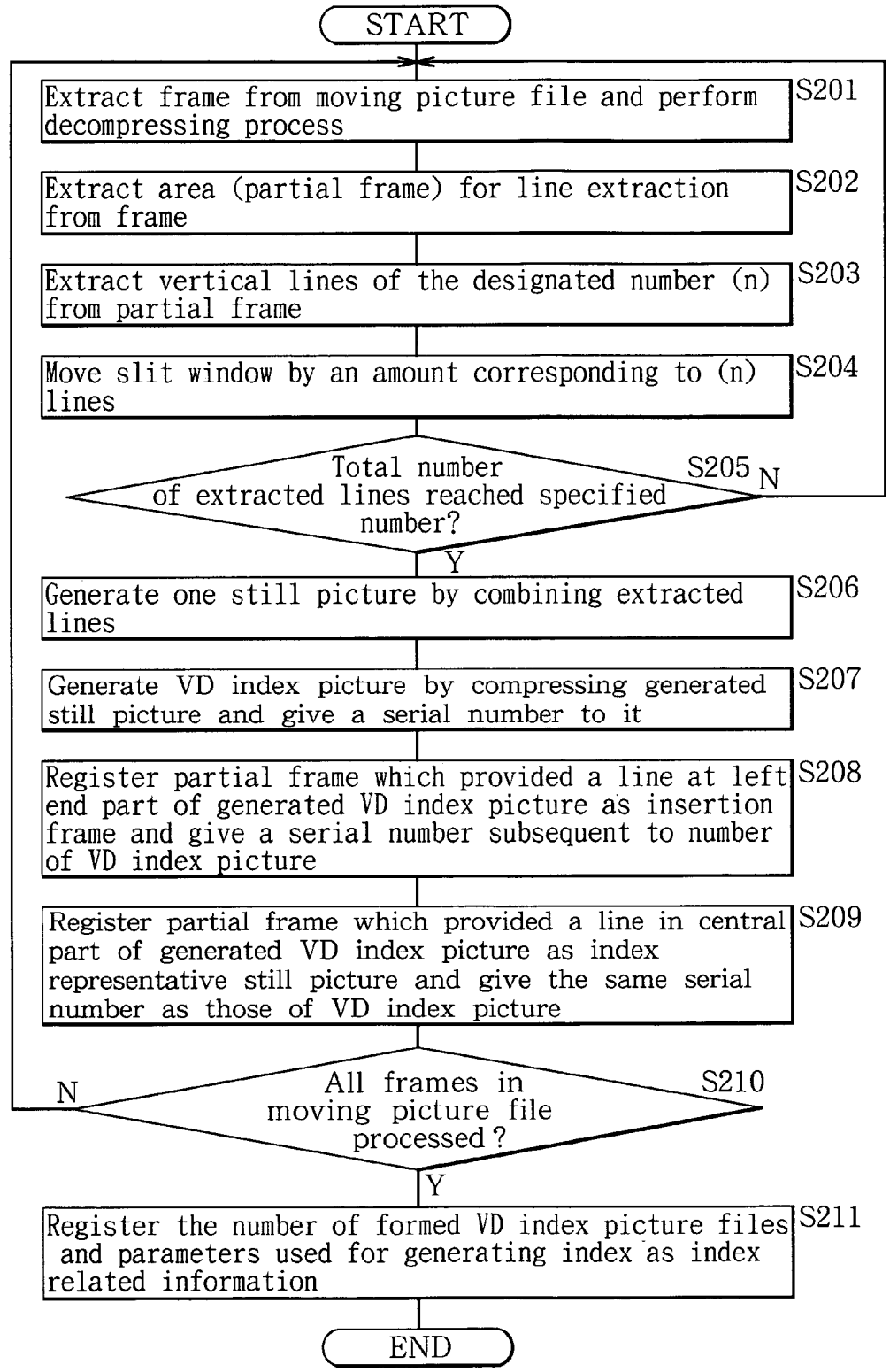
FIG. 12 is a flowchart showing an example of an index forming process in a forming mode (M7 mode) executed by the index forming unit illustrated in FIG. 1.

By referring to FIGS. 11 and 12, the operation of the index generating unit 87 as a main component of the moving picture server 5 will be described. FIG. 11 shows the whole operation of the index forming unit 87 and FIG. 12 shows the process in the M7 mode as an example of the process in the index generating unit 87.

First, by referring to FIG. 11, the whole operation of the index generating unit 87 will be described.

The index generating unit 87 monitors an input from the keyboard 53 in FIG. 3 or the like. When an index generation command is entered (step S101), the file name of a moving picture, index generation mode, the number of frames to be extracted, the number (n) of lines to be extracted, and the like are obtained from the entered command (step S102). The index generation mode is any of M1 to M8 mentioned above. The number of frames to be extracted is the number of frames used to generate one VD index picture. The number of lines to be extracted is the number of pixel lines in the vertical or horizontal direction of the slit image information SLj (FIG. 6C and so on) extracted from each frame by the moving slit window. In the following description, the slit image information will be also simply written as a line as necessary.

The index generating unit 87 checks the index forming mode entered. As a result, in the case of a whole frame extracting mode, that is, a mode which does not use the partial extraction method (Y in step S104) and a mode which does not use the frame mixing method (N in step S105), the index generating unit 87 executes the index forming process in either the M1 mode or the M2 mode (step S106 or S107). Specifically, in the case of the vertical extraction method, the index forming process is performed in the M1 mode. In the case of the horizontal extraction method, the index forming process is performed in the M2 mode.

In the case of the whole frame extracting mode (Y in step S104) and a mode using the frame mixing method (Y in step S105), the index generating unit 87 captures the sampling point of the insertion frame (such as the frame F$\alpha$1 in FIG. 9C) (step S108). The index generating unit 87 executes the index forming process in either the M3 mode or the M4 mode on the basis of the input data such as the number of frames extracted, the number (n) of lines extracted, and the sampling point of the insertion frame (step S109 or S110). Specifically, in the case of the vertical extraction method, the index forming process is performed in the M3 mode. In the case of the horizontal extraction method, the index forming process is performed in the M4 mode.

On the other hand, when the forming mode set is a mode using the partial extraction method (N in step S104), the index generating unit 87 captures data for designating an area to be extracted (that is, the size of the partial frame Fj' shown in FIG. 8C and the position in the frame) (step S1). Then the index generating unit 87 checks whether the generation mode set is a mode using the frame mixing method or not. When the generation mode does not use the frame mixing method (N in step S112), the index generating unit 87 executes the index generating process in either the M5 mode or M6 mode on the basis of the data such as the number of frames extracted, the number (n) of lines extracted, and the area to be extracted (step S113 or S114). Specifically, in the case of the vertical extraction method, the index generating process is performed in the M5 mode. In the case of the horizontal extraction method, the index generating process is performed in the M6 mode.

In the case of using the frame mixing method (Y in step S112), the index generating unit 87 further captures the sampling point of the insertion frame (step S115). The index generating unit 87 executes the index generating process in either the M7 mode or the M8 mode on the basis of the input data such as the number of frames extracted, the number (n) of lines extracted, the area to be extracted, and the sampling point in the insertion frame (step S116 or S117). Specifically, in the case of the vertical extraction method, the index generating process is performed in the M7 mode. In the case of the horizontal extraction method, the index generating process is performed in the M8 mode.

As described above, the index generating unit 87 performs the process of generating the VD) index picture in accordance with the requested generation mode.

By referring to FIG. 12, the process for generating an index picture in the M7 mode will be described as an actual processing example in the index generation unit 87. In the M7 mode, both the vertical extraction method and the frame mixing method are used on a partial frame to be extracted.

The index generation unit 87 first sets the moving slit window in the initial position, extracts a frame from the moving picture file, and performs a decompressing process by the MPEG processing unit 64 (step S201).

Then the index generating unit 87 extracts the area for line extraction from one frame (partial frame Fj' in FIG. 8C) (step S202) and extracts vertical lines of the designated number (n) by using the moving slit window from the partial frame Fj' (step S203). The index generating unit 87 moves the moving slit window by an amount corresponding to (n) lines (step S204).

The index generating unit 87 monitors the total number of lines extracted. When the total number of lines extracted does not reach a specified number (that is, the number of lines used to form one VD index picture) (N in step S204), the program again returns to step S201 and the processes in steps S201 to S203 are performed.

On the other hand, when the total number of extracted lines reaches the specified number (Y in step S204), the index generating unit 87 generates one still picture by joining the extracted lines (step S206) and the generated still picture is compressed to thereby generate one VD index picture IVi' (FIG. 8E). The VD index picture is provided with a serial number (step S207).

The index generating unit 87 registers a partial frame Fj' providing lines at the left end part of the formed VD index picture IVi' as an insertion frame F$\alpha$1 (FIG. 9C) or the like. The insertion frame is provided with a serial number subsequent to the number of the VD index pictures IVi' (step S208).

Further, the index generating unit 87 registers a partial frame Fj' providing lines in the central part of the generated VD index picture IVi' as an index representative still picture SP' (FIG. 8E). The same serial number as that of the VD index picture IVi' is given to index representative still picture SP' (step S209).

When the processs has not been finished for all of the frames in the moving picture file (N in step S210), the index generating unit 87 returns to step S201 and repeats the processes in steps S201 to S209.

When the processs is finished for all of the frames (Y in step S210), the margin is filled in with black so that the size of the resultant VD index picture is equal to the size of any other VD index picture. Further, the index forming unit 87 registers the number of generated VD index picture files IVi' and the formation parameters used to form an index picture (specifically, the number of frames used to form one VD index picture, the number (n) of lines extracted per frame, the direction of lines extracted, the size and the position in a frame of the area to be extracted (partial frame), the sampling point in the insertion frame, and so on) as index related information (step S211) and finishes the index forming process.

In the example of the M7 mode shown in FIG. 12, one VD index picture group in which the insertion frame is inserted between the neighboring VD index pictures is generated with regard to one title of moving picture. The formed VD index picture group and the index related information are sent to the web server 3 via the network 2 and stored in the index storing unit 74 and the index related information storing unit 76. The VD index pictures and the insertion frames constructing the VD index picture group are numbered consecutively in the respective forming processes and managed by the serial numbers. They are consequently used equivalent to the VD index picture group generated without using the frame mixing method.

Although the example of the M7 mode has been described in FIG. 12, with respect to the other modes, besides differences occurring according to the presence or absence of a processing step for applying the partial extraction method or the frame mixing method, the processes in the basic part of each of the modes are substantially the same as those of FIG. 12 and their description is omitted.

FIGS. 13A to 13C and FIGS. 14A to 14C show examples of VD index pictures formed in the various generation modes based on the same moving picture. Each of FIGS. 13A to 13C shows a VD index picture group formed in the M1 mode (mode of extracting vertical lines from the whole frame and mixing no insertion frame). Among them, FIG. 13A relates to a case where the number of line extracted per frame is one. FIG. 13B relates to a case where the number of lines extracted per frame is two. FIG. 13C relates to a case where the number of lines extracted per frame is four.

As understood from the representations, the smaller the number of lines extracted is, the smaller the number of generated VD index pictures formed is. On the contrary, since the degree of summarization is higher, it is less easy to grasp the contents of the original moving picture. The larger the number of lines extracted is, the larger the number of VD index pictures generated becomes. On the contrary, since the degree of summarization is lower, it is easier to grasp the contents of the original moving picture.

FIG. 14A shows a VD index picture group formed when the number of lines extracted per frame is set to two in the M2 mode (mode in which the horizontal lines are extracted from the whole frame and no insertion frame is mixed). FIG. 14B represents a VD index picture group generated when the number of lines extracted per frame is two in the M5 mode (mode of extracting vertical lines from the partial frame and mixing no insertion frame). The size of the partial frame in this case is 70% of the original frame and the extraction position of the partial frame is the central part of the original frame. FIG. 14C shows a VD index picture group formed in the case where the number of lines extracted per frame is two in the M3 mode (mode of extracting vertical lines from the whole frame and mixing the insertion frames). The insertion frame in this case is extracted every predetermined time (5 seconds in the example of the representation) from the original moving picture.

As understood from the comparison between FIGS. 14A and 13B, although the forming conditions of both representations are the same except for the line extracting direction (vertical or horizontal direction), the number of VD index pictures of FIG. 14A is larger than that of FIG. 13B since the number of vertical lines and the number of horizontal lines in a frame are different from each other. As a result of the difference of the line extracting direction between FIG. 14A and FIG. 13B, the contents of the VD index pictures of FIG. 14A and those of FIG. 13B are considerably different from each other. As described above, for example, when the moving picture as an original material is obtained by panning the camera in the horizontal direction, the vertical line extraction as shown in FIG. 13B is suitable. When the moving picture is obtained by panning the camera in the vertical direction, the horizontal line extraction as shown in FIG. 14A is suitable.

As understood from the comparison between FIGS. 14B and 13B, although the forming conditions of both of the representations are the same except for the areas from which lines are extracted, the size of each VD index picture of the former case is smaller than that of the latter case for the following reason. The lines are extracted from the partial frame in the former case. On the contrary, the lines are extracted from the whole original frame in the latter case. In the case of the extraction from the partial frame as shown in FIG. 14B, as described above, the size of the VD index picture is small and the data amount is small. The size of a storing area (to be specific, the index storing unit 74 in the web server 3 or the like) for holding it can be accordingly small.

As understood from the comparison between FIGS. 14C and 13B, the forming conditions of both of the diagrams are the same except for whether the frames are mixed or not. The number of elements included in the VD index picture group of the latter case is larger than that of the former case since not only the formed VD index pictures but also the insertion frames are included in the latter case. As described above, in the latter case, since the original frame is included as it is, the contents of the original moving picture can be more easily grasped.

Referring to FIGS. 15 and 16, the general operation of the moving picture retrieving and distributing system with the above configuration will now be described. FIGS. 15 and 16 show a series of operations in each of the web server 3, the terminal device 4, the moving picture server 5 and the database server 6. A series of operations of retrieving the VD index picture of the corresponding moving picture by the web server 3 and the database server 6 in response to a retrieval request from the terminal device, displaying the retrieved VD index picture on the browser screen of the terminal device 4, displaying the index representative still picture corresponding to a selected one of the displayed VD index pictures, and further reproducing and displaying the moving picture corresponding to the selected VD index picture will be described. It is assumed that the VD index pictures of the moving picture stored in the moving picture storing unit 85 in the moving picture server 5 have been already stored in the index storing unit 74 in the web server 3, and the index representative still picture is stored in the still picture storing unit 79.

When the Internet browser unit 81 is activated in the terminal device 4 (S1 in FIG. 15), the Internet browser unit 81 accesses the web server 3 via the network 2 (S2). When accessed by the terminal device 4, the Internet server unit 71 in the web server 3 reads the GUI data used to describe the homepage for moving picture retrieval from the GUI data storing unit 78 and distributes the read GUI data to the terminal device 4 (S3).

The Internet browser unit 81 in the terminal unit 4 displays an initial screen (not shown) of the homepage for moving picture retrieval on the browser screen of the display apparatus 32 (FIG. 2) on the basis of the GUI data sent from the web server 3 (S4).

When a moving picture retrieval keyword (hereinbelow, simply called a keyword) is entered (S5), the Internet browser unit 81 transmits the entered keyword together with the moving picture retrieval request to the web server (S6).

Upon receipt of the moving picture retrieval request and the keyword from the terminal device 4, the Internet server unit 71 in the web server 3 activates the database searching unit 72. The database searching unit 72 transmits a moving picture information retrieval command code together with the keyword to the database server 6 via the Internet server unit 71 and the network 2 (S7).

The searching unit 92 in the database server 6 searches the database 91 on the basis of the received keyword and transmits the search result to the web server 3 (S8).

The web server 3 which has received the search result from the database server 6 activates the index retrieving unit 73. The index retrieving unit 73 retrieves the corresponding VD index file from the index storing unit 74 on the basis of the search result from the database server 6 (S9) and transfers the VD index file to the GUI data forming unit 77.

The GUI data generation unit 77 generates the GUI data on the basis of the retrieval result from the database server and the retrieval result from the index storing unit (S10). The GUI data includes the title name of the moving picture, the moving picture file name, the storage place of the moving picture file in the moving picture server 5, and the VD index picture.

At the time of generating the GUI data, the index related information including the display format of the VD index picture, the number of images displayed, and the arrangement of the images, which is stored in the index related information storing unit 76 is referred to. GUI data having the contents capable of realizing an optimum screen layout adapted to the length of the moving picture, the size of the browser screen of the display apparatus 32 of the terminal device 4, and the like is consequently generated. The index related information is generated by the index related process unit 75 on the basis of the data indicative of the size of the browser screen of the display apparatus 32 of the terminal device 4, the data indicative of the length of the retrieved moving picture, and the like sent together with the access request from the terminal device 4. The index related information is stored in the index related information storing unit 76.

The GUI data forming unit 77 stores the generated GUI data into the GUI data storing unit 78 and transmits it as a retrieval result to the terminal device 4 (S12).

The Internet browser unit 81 in the terminal device 4 receives the GUI data sent from the web server 3 and, on the basis of the data, as shown in FIG. 4, displays the keyword, the number 106 of corresponding moving pictures, the title names of the moving pictures, and the VD index picture groups 107 and 108 as the contents of the retrieval result in the index display area 102 on the retrieval result display screen (S12).

The Internet browser unit 81 in the terminal device 4 monitors both the position of the mouse pointer 109 and whether the mouse is clicked or not. When it is determined that the mouse pointer 109 (FIG. 4) is on any of the VD index pictures and no click is made, the Internet browser unit 81 obtains information for specifying the VD index picture (hereinbelow, called index specifying information) (S13 in FIG. 16). The index specifying information includes, for example, the VD index file name, serial numbers given to the VD index pictures, and so on. The Internet browser unit 81 transmits a request of transmitting the index representative still picture together with the index specifying information obtained to the web server 3 (S14).

The Internet server unit 71 in the web server 3 obtains the index representative still picture requested by the terminal device 4 from the still picture storing unit 79 and transmits it to the terminal device 4 (S15).

The Internet browser unit 81 in the terminal device 4 receives the index representative still picture sent from the web server 3 and displays it in the still picture display area 103 (FIG. 4) of the browser screen (S16).

Further, the Internet browser unit 81 in the terminal device 4 monitors both the position of the mouse pointer and the whether the mouse is clicked or not. When it is determined that the mouse is clicked in a state where the mouse pointer 109 (FIG. 4) is on any of the VD index pictures, the Internet browser unit 81 obtains the index specifying information of the VD index picture (S17). The Internet browser unit 81 transmits the request of transmitting the moving picture reproduction command code together with the obtained index specifying information to the web server 3 (S18).

When the transmission request of the moving picture reproduction instruction code and the index specifying information sent from the terminal device 4 are received, the Internet server unit 71 in the web server 3 specifies the corresponding moving picture on the basis of the VD index specifying information, generates the moving picture reproduction command code including the file name of the moving picture, the storage adderss of the moving picture file, and the reproduction start position and transmits the moving picture reproduction command code to the terminal device 3 (S19).

The Internet browser unit 81 in the terminal device 4 receives the moving picture reproduction command code from the web server 3 and requests the moving picture server 5 to distribute the moving picture on the basis of the moving picture reproduction command code (S20).

The moving picture distributing unit 86 in the moving picture server 5 retrieves the corresponding moving picture from the moving picture storing unit 85 on the basis of the moving picture reproduction command code sent from the terminal device 4 and distributes it to the terminal device 4 in real time (S21). At this time, the moving picture distributing unit 86 takes the compressed moving picture data in the moving picture storing unit 85 from the reproduction start position designated by the moving picture reproduction command code and distributes it.

The moving picture reproducing unit 82 in the terminal device 4 displays the moving picture 104a in the moving picture display area 104 (FIG. 4) in the browser screen while performing a decompressing process or the like on the moving picture data distributed from the moving picture server 5 (S22). At this time, the reproduction start position of the moving picture is, for example, the position corresponding to the head part of the selected VD index picture.

In such a state, an operation such as the reproduction, stop, pause, high-speed replay, reverse replay, or high-speed reverse replay of the moving picture 104a is instructed to the operating unit 104c by the mouse pointer 109, the Internet browser unit 81 transmits the command code corresponding to the operation to the moving picture server 5. The moving picture distributing unit 86 in the moving picture server 5 which has received the command code reproduces the moving picture in the moving picture storing unit 85 in the form according to the command code and distributes the reproduced moving picture to the terminal device 4. All the operations are executed almost in real time. When the enlargement display icon 104d in FIG. 4 is clicked, the Internet browser unit 81 enlarges and displays the moving picture 104a on the full browser screen.

As described above, according to the moving picture retrieving and distributing system of the embodiment, for forming the VD index picture by summarizing the contents of the moving picture, the forming process can be performed in a plurality of different modes. Thus, the VD index picture in a proper form can be generated according to the property, use, or the like of the material.

Although the invention has been described by the embodiment, the invention is not limited to the embodiment but can be variously modified.

For example, it has been described in the embodiment that the line extracting direction is either the vertical or horizontal direction. It is also possible to extract lines in the other directions (oblique directions). The invention is not limited to the line extraction. It is also possible to perform block extraction of extracting image data from each frame by using a block window of a rectangle shape or the like which moves with time.

In the embodiment, as shown in FIGS. 8A to 8C, a partial frame is extracted from the central part of the original frame. The invention is not limited to the position. The other part such as the left or right half or the upper or lower half of a frame may be extracted as the partial frame. Since an important image is generally included in the central part of a frame, it is suitable to extract a partial frame from the central part.

As shown in FIGS. 9A to 9C, in the embodiment, the insertion frames are inserted between neighboring VD index pictures generated. The invention is not limited to the arrangement. The insertion frames may be inserted in the other manners. For instance, the insertion frames can be inserted not between neighboring VD index pictures but inserted intermittently (discretely). The insertion frame may be sampled at an arbitrary timing in the moving picture.

Although the index generating unit 87 is disposed in the moving picture server 5 in the foregoing embodiment, it may be disposed in the web server 3. It is also possible to use only the index generating unit 87 as an independent server and connect it to the network 2.

In the embodiment, the moving picture retrieving and distributing system in which the web server 3, terminal device 4, moving picture server 5 and database server 6 are arranged so as to be dispersed and the components are connected to each other via the network 2 has been described. Alternatively, all the components can be provided in a single apparatus and the system can be configured as a standalone moving picture retrieving apparatus.

As described above, in the image generating apparatus according to any one of claims 1 to 6 or the image generating method according to any one of claims 7 to 13, the process of extracting a part of each of the plurality of still pictures and generating an index picture according to each form on the basis of the extracted parts can be performed in a plurality of different modes. For example, an effect such that an index picture in a proper mode according to the property, use, or the like of the moving picture material can be obtained by properly selecting the generating mode is produced.

In particular, in the image forming apparatus according to claim 4 or the image forming method according to claim 11, the plurality of different modes include mode of extracting a part from a limited area in each of the plurality of still pictures. By using the mode, an effect that a compact and simple index picture can be obtained is produced.

In the image forming apparatus according to claim 6 or the image forming method according to claim 13, some still pictures are extracted from a plurality of still pictures and are used also as index pictures. Consequently, there is an effect such that, even in the case where the contents of the original moving picture cannot be easily known from only the index picture, the contents of the moving picture can be grasped easier by seeing the added still pictures.

Obviously many modifications and variations of the present invention are possible in the light of the above teachings. It is therefore to be understood that within the scope of the appended claims that invention may be practiced otherwise than as specifically described.

What is claimed is:

1. An image generating apparatus comprising index picture generating means for generating an index picture as a still picture representing the contents of a moving picture in a summarized form by combining parts each of which is taken from each of a plurality of still pictures arranged in time sequence so as to construct the moving picture,
wherein the index picture generating means has the function of extracting a part from each of the plurality of still pictures in a plurality of different modes and generating an index picture according to each mode on the basis of the extracted parts, and
wherein the plurality of different modes include a mode of extracting a partial image elongated in the vertical direction from each of the plurality of still pictures.

2. The image generating apparatus according to claim 1, wherein the plurality of different modes include a mode of extracting a part from a limited area of each of the plurality of still pictures.

3. The image generating apparatus according to claim 2, wherein the limited area is a central area in each of the plurality of still pictures.

4. The image generating apparatus according to claim 1, wherein the index picture forming means further has a function of extracting some of the plurality of still pictures and using the extracted still pictures also as index pictures.

5. An image generating apparatus comprising index picture generating means for generating an index picture as a still picture representing the contents of a moving picture in a summarized form by combining parts each of which is taken from each of a plurality of still pictures arranged in time sequence so as to construct the moving picture,
wherein the index picture generating means has the function of extracting a part from each of the plurality of still pictures in a plurality of different modes and generating an index picture according to each mode on the basis of the extracted parts, and
wherein the plurality of different modes include a mode of extracting a partial image elongated in the horizontal direction from each of the plurality of still pictures.

6. The image generating apparatus according to claim 5, wherein the plurality of different modes include a mode of extracting a part from a limited area of each of the plurality of still pictures.

7. The image generating apparatus according to claim 6, wherein the limited area is a central area in each of the plurality of still pictures.

8. The image generating apparatus according to claim 5, wherein the index picture forming means further comprises a fiction of extracting some of the plurality of still pictures and using the extracted still pictures as index pictures.

9. An image generating method for generating an index picture as a still picture representing the contents of a moving picture in a summarized form by combining parts taken from each of a plurality of still pictures arranged in time sequence so as to construct the moving picture, comprising the steps of:
selecting any of a plurality of different modes for extracting a part from each of the plurality of still pictures;
extracting a part from each of the plurality of still pictures in accordance with the selected mode; and
generating an index picture by combining the extracted parts,
wherein the plurality of different modes include a mode of extracting a partial image elongated in the vertical direction from each of the plurality of still pictures.

10. The image generating method according to claim 9, wherein the plurality of different modes include a mode of extracting a part from a limited area of each of the plurality of still pictures.

11. The image generating method according to claim 10, wherein the limited area is a central area in ach of the plurality of still pictures.

12. The image generating method according to claim 9, wherein some of the plurality of still pictures are extracted and used as index pictures.

13. An image generating method for generating an index picture as a still picture representing the contents of a moving picture in a summarized form by combining parts taken from each of a plurality of still pictures arranged in time sequence so as to construct the moving picture, comprising the steps of:
selecting any of a plurality of different modes for extracting a part from each of the plurality of still pictures;
extracting a part from each of the plurality of still pictures in accordance with the selected mode; and
generating an index picture by combining the extracted parts, wherein the plurality of different modes include a mode of extracting a partial image elongated in the horizontal direction from each of the plurality of still pictures.

14. The image generating method according to claim 13, wherein the plurality of different modes include a mode of extracting a part from a limited area of each of the plurality of still pictures.

15. The image generating method according to claim 14, wherein the limited area is a central area in each of the plurality of still pictures.

16. The image generating method according to claim 13, wherein the index picture forming means further comprises a function of extracting some of the plurality of still pictures and using the extracted still pictures as index pictures.

* * * * *